United States Patent
Rudoff et al.

(10) Patent No.: US 6,789,094 B2
(45) Date of Patent: Sep. 7, 2004

(54) METHOD AND APPARATUS FOR PROVIDING EXTENDED FILE ATTRIBUTES IN AN EXTENDED ATTRIBUTE NAMESPACE

(75) Inventors: Andrew M. Rudoff, Boulder, CO (US); Mark J. Maybee, Boulder, CO (US); Mark L. Shellenbaum, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 325 days.

(21) Appl. No.: 09/915,199

(22) Filed: Jul. 24, 2001

(65) Prior Publication Data

US 2002/0062301 A1 May 23, 2002

Related U.S. Application Data

(60) Provisional application No. 60/220,796, filed on Jul. 25, 2000.

(51) Int. Cl.$^7$ .............................................. G06F 17/30
(52) U.S. Cl. ........................ 707/200; 707/10; 707/101; 707/205
(58) Field of Search ............................... 707/200, 201, 707/205, 9, 10, 100, 101

(56) References Cited

U.S. PATENT DOCUMENTS

| | | | | |
|---|---|---|---|---|
| 5,617,568 A | * | 4/1997 | Ault et al. ................. | 707/101 |
| 5,940,841 A | * | 8/1999 | Schmuck et al. .......... | 707/205 |
| 6,006,018 A | * | 12/1999 | Burnett et al. ............. | 709/219 |
| 6,185,574 B1 | * | 2/2001 | Howard et al. ............ | 707/200 |
| 6,389,427 B1 | * | 5/2002 | Faulkner .................. | 707/104.1 |
| 6,470,345 B1 | * | 10/2002 | Doutre et al. ............. | 707/100 |

OTHER PUBLICATIONS

Rubini, Alessandro, Kernel Korner: The "Virtual File System" in Linux, Linux Journal vol. 1997, Issue 37, May 1997.*

McVoy et al., "Extent–like Performance from a UNIX File System", USENIX, Winter 1991, Dallas, Tx, 12 pages.*

* cited by examiner

*Primary Examiner*—Srirama Channavajjala
*Assistant Examiner*—Khanh Pham
(74) *Attorney, Agent, or Firm*—Beyer Weaver & Thomas LLP

(57) ABSTRACT

A system for providing extended file attributes is described. Logically, attributes are supported as files within the file system. In this way, the file system is augmented with an orthogonal namespace of file attributes. According, any file (including attribute files) may have an arbitrarily deep attribute tree associated with it. Access to the attribute values is via file descriptors obtained via a special attribute interface. This logical view of "attributes as files" allows the leveraging of existing file system interface functionality to support the construction, deletion, and manipulation of attributes.

7 Claims, 7 Drawing Sheets

METHOD AND APPARATUS FOR PROVIDING EXTENDED FILE ATTRIBUTES IN AN EXTENDED ATTRIBUTE NAMESPACE

CROSS REFERENCE TO RELATED APPLICATION

This application takes priority under U.S.C. 119(e) of U.S. Provisional Application No.: 60/220,796 filed Jul. 25, 2000 entitled, "API FOR EXTENDED ATTRIBUTES" by Rudoff et al which is incorporated by reference in its entirety for all purposes.

BACKGROUND OF THE INVENTION

1. Field of Invention

This invention relates generally to computing systems. Specifically, a set of interfaces for adding support for general file attributes with an orthogonal namespace of file attributes is disclosed.

2. Description of Related Art

The UNIX file system is hierarchical in that it resembles a tree structure. The tree is anchored at a place called the root, designated by a slash "/". Every item in the UNIX file system tree is either a file, or a directory that is like a file folder that can contain files, and other directories. A directory contained within another is called the child of the other. A directory in the files system tree may have many children, but it can only have one parent. UNIX files can have attributes (as represented in FIG. 1 as UFS attribute namespace 100) such as size, permissions, create time, etc associated with it. For example, every file and directory has associated with it ownership, and access permissions for which one is able to specify those to whom the permissions apply. Permissions are defined as read, write, and execute. Those to whom the permissions apply are the user who owns the file, those who are in the same group as the owner, and all others. In order to examine the various attributes of a particular UNIX file or directory (such as access permissions 102) included in the UFS attribute space 100, a UNIX attribute API 104 is used.

Unfortunately, however, if the API 104 was used to examine, for example, the attributes for a UDFS file or a PCFS file, only those UDFS file attributes (i.e., region I) or those PCFS attributes (i.e., region III) included in the UNIX attribute space 100 would be exposed by the API 104. The UDFS or PCFS attributes outside the UNIX attribute space (i.e. regions II and IV, respectively) and the information associated therewith would lost.

Therefore what is desired is an attribute model and associated API, method, and system for providing an extensible set of file attributes.

SUMMARY OF THE INVENTION

According to the present invention, methods, apparatus, and systems are disclosed for providing a cascadable state machine for broadcast content is disclosed.

In one embodiment, a method a exposing a value of a selected extended attribute in an extended attribute namespace, wherein the extended attribute is associated with a node in a directory tree namespace that is orthogonal to the extended attribute namespace is disclosed. If a mapping for a selected extended attribute exists does not exist, then in the extended attribute namespace, a virtual directory is created, a virtual file is created, and the virtual file is associated with the virtual directory. The content of the virtual file is mapped to the selected extended attribute and a selected extended attribute operation is performed. The value of the selected extended attribute is then exposed.

In another embodiment, an apparatus for a exposing a value of a selected extended attribute in an extended attribute namespace, wherein the extended attribute is associated with a node in a directory tree namespace that is orthogonal to the extended attribute namespace is disclosed.

In still another embodiment, computer program product for exposing a value of a selected extended attribute in an extended attribute namespace, wherein the extended attribute is associated with a node in a directory tree namespace that is orthogonal to the extended attribute namespace is disclosed.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

The basic premise behind this invention is that, logically, attributes are supported as files within the file system. In this way, the file system is augmented with an orthogonal namespace of file attributes. According, any file (including attribute files) may have an arbitrarily deep attribute tree associated with it. Access to the attribute values is via file descriptors obtained via a special attribute interface. This logical view of "attributes as files" allows the leveraging of existing file system interface functionality to support the construction, deletion, and manipulation of attributes.

The invention will now be described in terms of the UNIX based file system (UFS). However, it should be noted that the invention is equally well suited for use in any file system for which an extensible hierarchical system for associating a set of attributes to a particular file is desired. It should also be noted that throughout this discussion, concepts and issues will be discussed based upon the logical model of attributes as files stored within directory structures. However, this should not be construed as limiting either the scope or intent of the invention, since any particular implementation need not adhere to the specific structures implied by this logical model.

Figure 1:
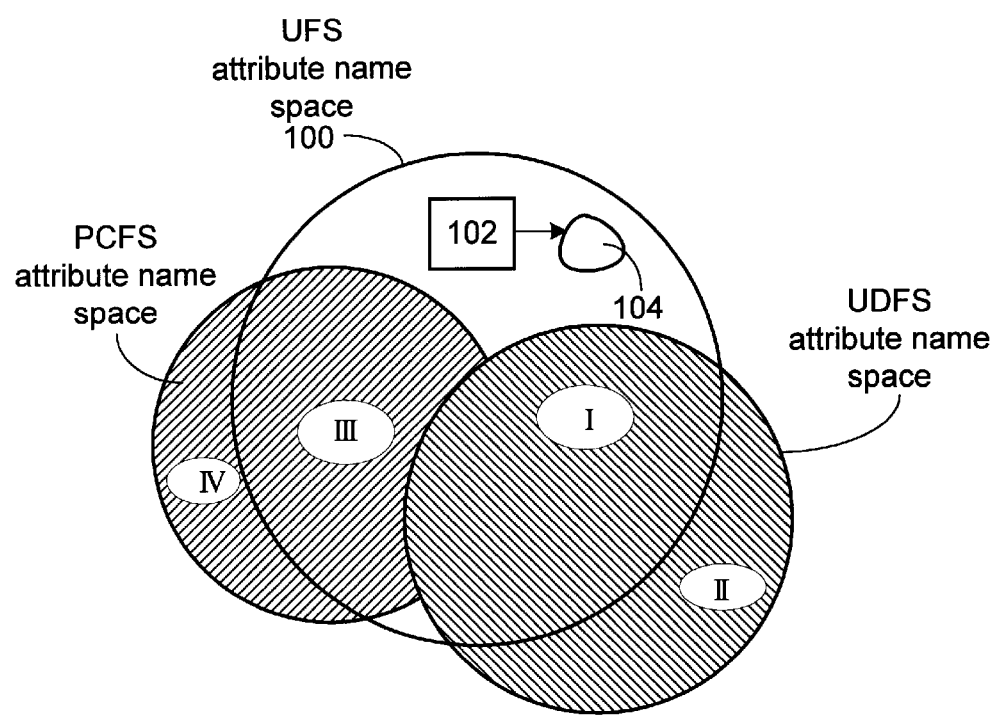
FIG. 1 shows as UFS attribute namespace in relation to a PCFS and UDFS attribute namespace.
Figure 2:
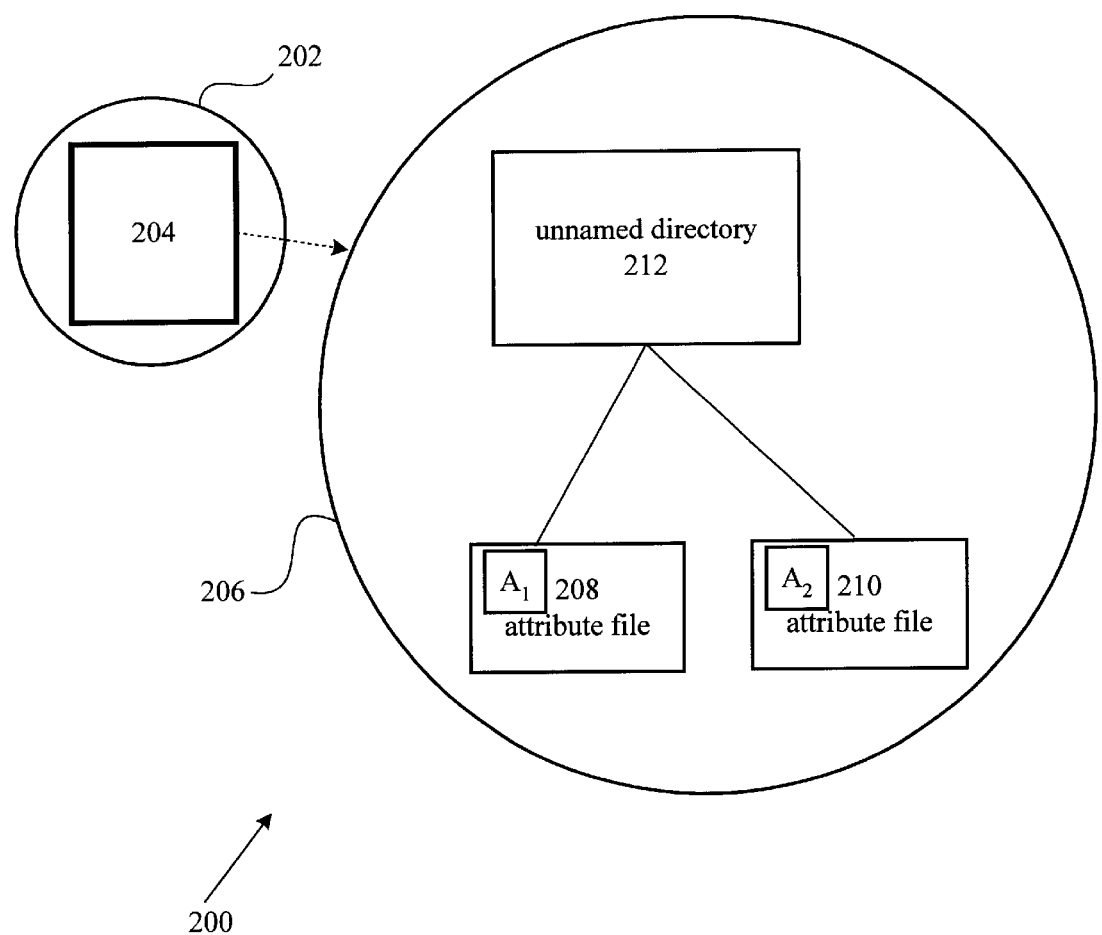
FIG. 2 depicts an attribute namespace model with a UNIX file space having embedded therein a UNIX file and its associated attribute namespace for providing an extensible set of attributes in accordance with an embodiment of the invention.

Accordingly, FIG. 2 depicts an attribute namespace model 200 with a UNIX file space 202 having embedded therein a UNIX file 204 and its associated attribute namespace 206 for providing an extensible set of attributes in accordance with an embodiment of the invention. It should be noted that since for this discussion, the UNIX file 204 is embedded in the UNIX space 202, the attribute namespace 206 can be viewed as being orthogonal to both the UNIX file space 202 and the UNIX file 204(as represented by a dashed line). Specifically, the file 204 has two directly associated attributes 1 and 2 that are logically associated, respectively, with attribute files 208 and 210 that are each, in turn, associated with an unnamed directory 212. In the described embodiment, the unnamed directory 212 and attribute files 208 and 210 are each embedded in the attribute namespace 206 and are therefore orthogonal to the UNIX file 204. It should be noted that the precise nature of this association is implementation specific. Conceptually, the attribute model 200 presented here is fully general in that extended attributes may be any type of file (doors, links, directories, etc.) and can even have their own attributes (fully recursive). As a result, the attributes associated with a file could be an arbitrarily deep directory hierarchy where each attribute could have an equally complex attribute tree associated with it as shown in FIG. 3.

Figure 3:
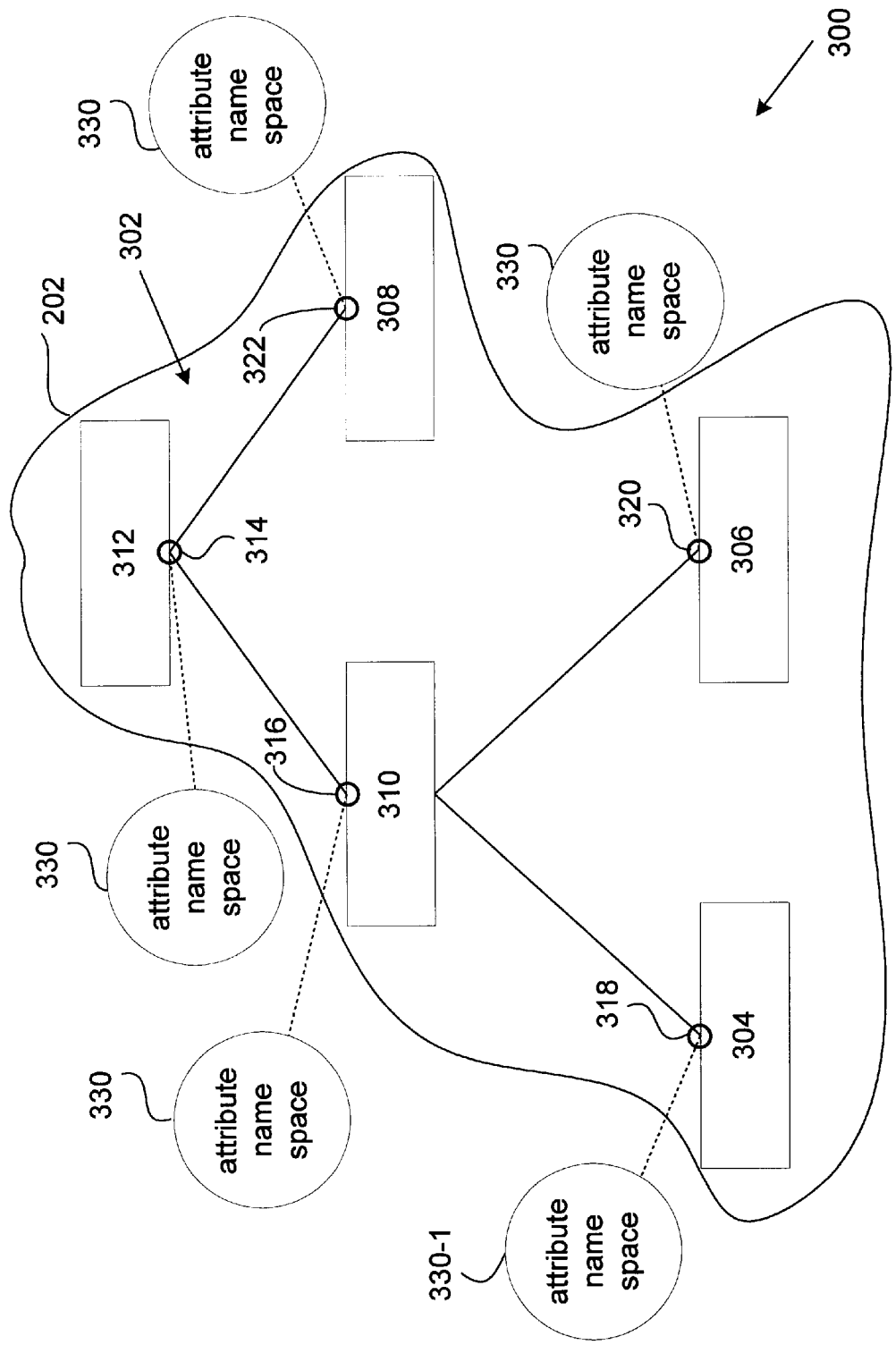
FIG. 3 shows a generalized n-dimensional attribute space model based upon a tree structure in accordance with an embodiment of the invention.

Accordingly, FIG. 3 shows a generalized n-dimensional attribute space model 300 based upon a tree structure 302 in accordance with an embodiment of the invention. In general, the tree structure 302 represents an algorithm for placing and locating files (called records or keys) in a database that finds data by repeatedly making choices at a decision point referred to as a node. A node can have any number of branches (also called children) at the ends of which are stored records in locations called leaves. This name derives from the fact that records always exist at end points. The starting point is called the root. The maximum number of children per node is called the order of the tree. The maximum number of access operations required to reach the desired record is called the depth. In some trees, the order is the same at every node and the depth is the same for every record.

With regards to the UNIX file system, there is one hierarchical file system on a UNIX based computer, often depicted as the inverted tree structure 302 where each leaf of the tree is a file (i.e.,. files 304, 306, and 308), each non-leaf is a directory (i.e., directory 310) and at the top of the tree 302 is a 'root' directory 312 each of which has an associated node. For example, the root directory 312 has an associated node 314, the directory 310 has associated node 316 whereas the files 304, 306, and 308 are respectively associated with nodes 318, 320, and 322.

Figure 4:
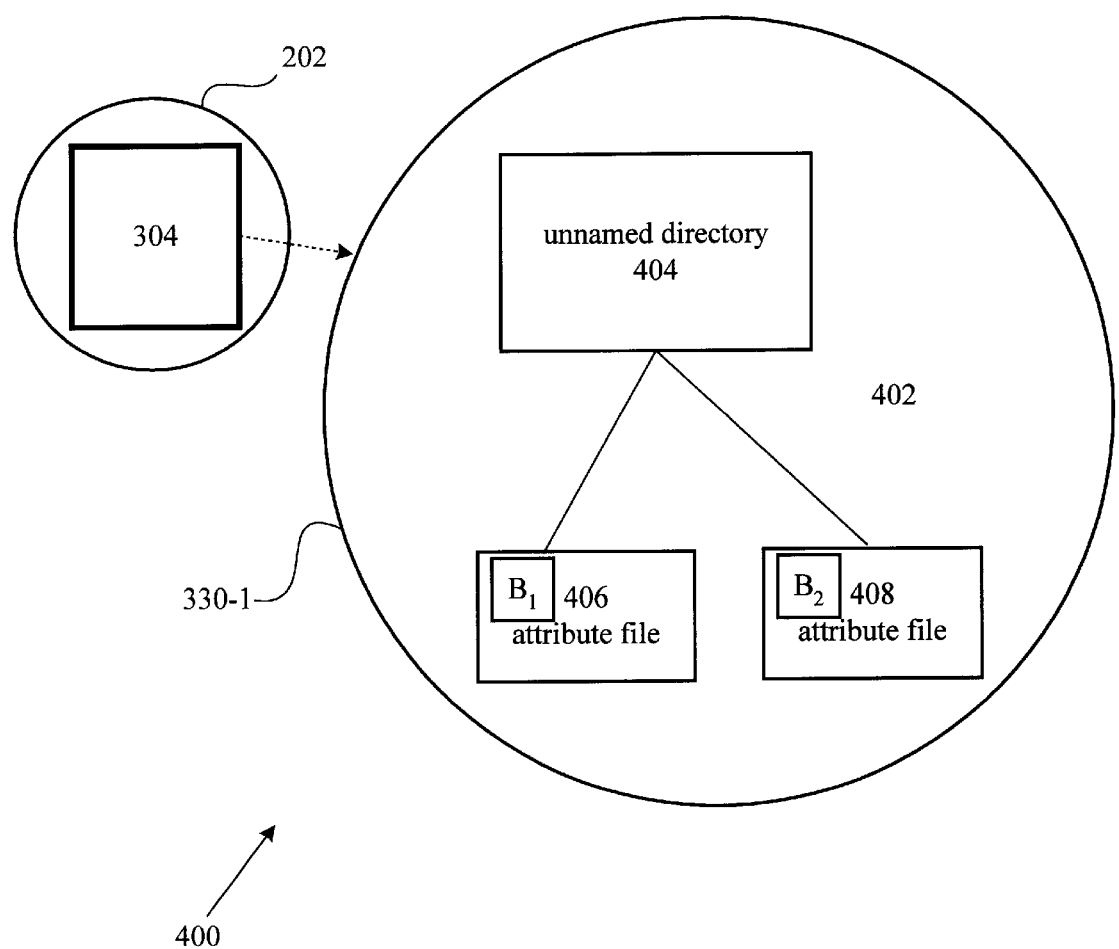
FIG. 4 shows an exemplary extended attribute namespace representation in accordance with an embodiment of the invention.

In the described embodiment, the tree structure 302 while embedded in the UNIX file space 202, is orthogonal to an n-dimensional attribute namespace 330 associated with each node of the tree 302 (i.e., and therefore the corresponding root directory, directory, and file). For example, the file 304 has an associated attribute namespace 330-1 shown in FIG. 4 having an attribute namespace tree 402 with an unnamed directory 404, and attributes 3 and 4 associated with attribute files 404 and 406, respectively. It should be noted that due to the recursive nature of the inventive attribute namespace model, each of the nodes of the tree 402 can themselves have an orthogonal attribute namespace associated therewith (although not shown for sake of clarity). In this way, each node of the tree 302 can potentially be a root of a new tree of extended attributes which in a recursive system would have nodes each of which are roots of another tree of extended attributes, etc.

In one implementation, in order to transition from the file space 202 to the extended attribute name space 330-1, for example, an orthogonal API for extended attributes provides a generic utility that "tunnels" into the extended attribute name space 330-1 from the file space 202. In this way, the extended attribute namespace 330-1 is exposed so that the extended attributes can be manipulated with standard utilities.

Figure 5:
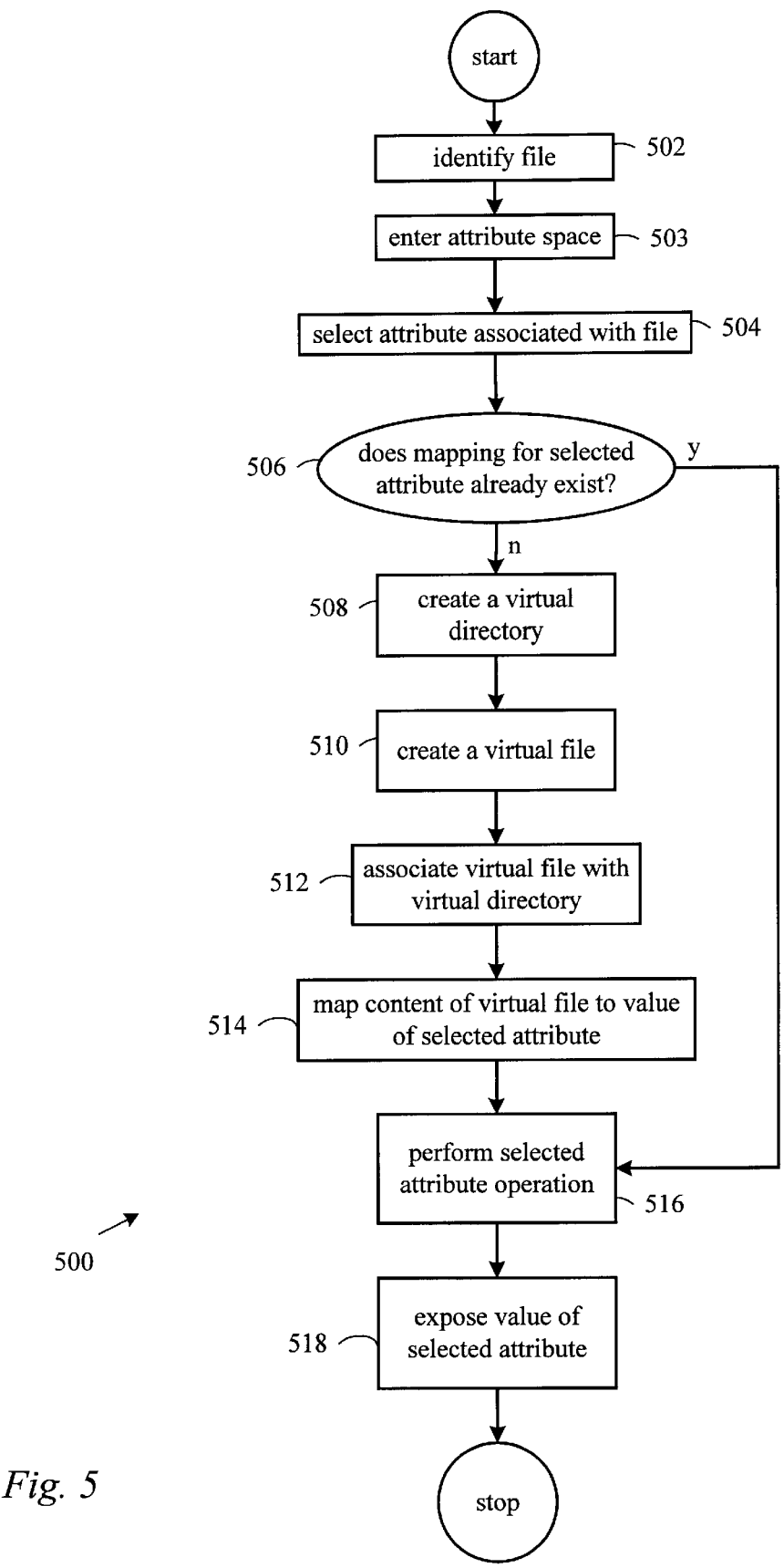
FIG. 5 illustrates a flowchart detailing a process for accessing extended attributes in accordance with an embodiment of the invention.

Accordingly, FIG. 5 illustrates a flowchart detailing a process 500 for mapping an attribute in order to expose its value in accordance with an embodiment of the invention. The process 500 begins at 502 by identifying a file after and entering attribute space at 503. Next, at 504, an attribute associated with the identified file is selected. At 506, a determination is made whether or not a mapping for the selected attribute already exists. If the selected attribute does not exist, then at 508 a virtual directory is created and at 510 a virtual file is created. The virtual file is then associated with the virtual directory at 512 while at 514 the contents of the virtual file is mapped to the value of the selected attribute. Next, at 516, a selected attribute operation is performed while at 518, the value of the selected attribute is exposed.

Returning to 506, if the selected attribute has been determined to exist, then control is passed directly to 516.

Figure 6:
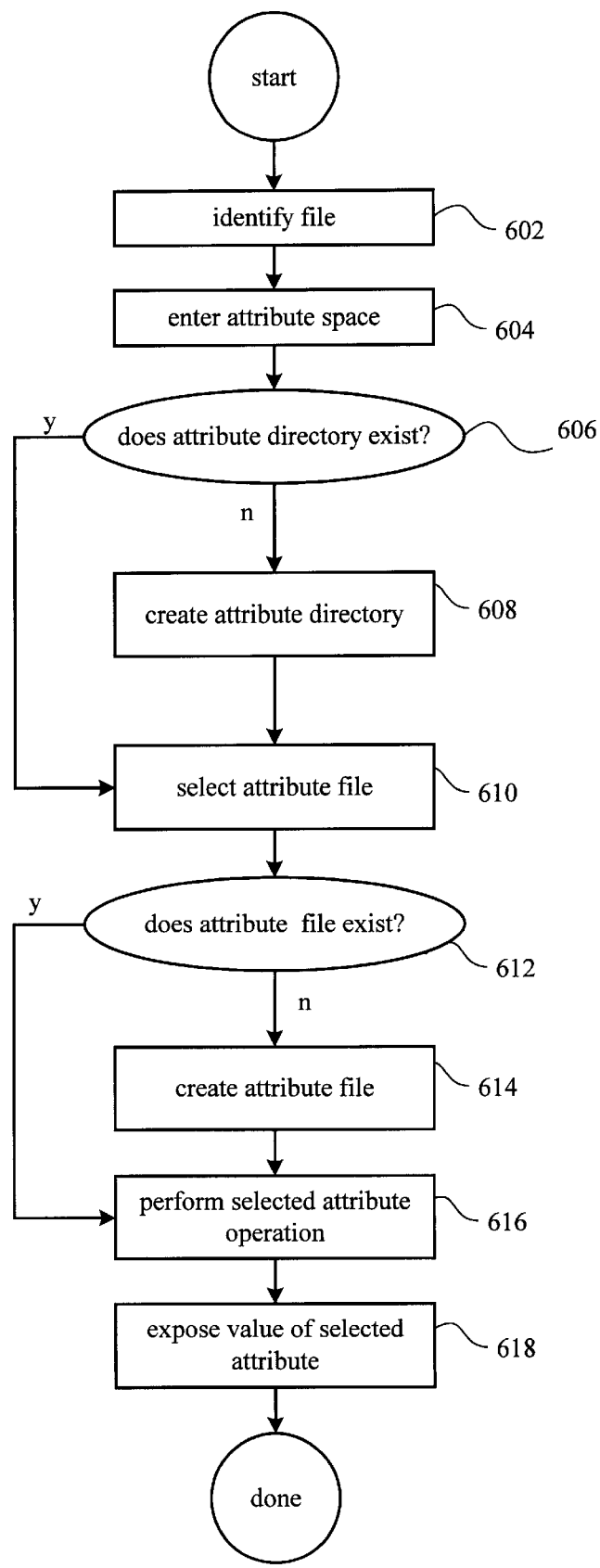
FIG. 6 illustrates a flowchart detailing a process for creating a new attribute to associate with a file in accordance with an embodiment of the invention.

FIG. 6 illustrates a flowchart detailing a process 600 for creating a new attribute to associate with a file in accordance with an embodiment of the invention. It should be noted that although the process 600 is shown on a separate flowchart from the process 500 for clarity purposes only, the process 600 can in any case be incorporated into the process 500 in a general embodiment. Accordingly, the process 600 begins at 602 by identifying a file and entering attribute space at 604. At 606, a determination is made whether or not an attribute directory exists. If the attribute directory does not exist, then at 608 the attribute file is created and at 610, the attribute file is selected. Returning to 606, if it has been determined that the attribute directory does exist, then control is passed directly to 610.

In any case, after the attribute file is selected at 610, a determination is made at 612 whether or not the selected attribute file exists. If the selected attribute file does not exist, then the attribute file is created at 614, the selected attribute operation is performed at 616, and the value of the selected attribute is exposed at 618. Returning to 612, if it has been determined that the selected attribute file exists, then control is passed directly to 616.

It is one of the advantages of the invention that since not all implementations will be able to (or desire to) support the full model, it is therefore possible that a particular implementation may reject operations that are not supported. For example, a particular implementation of the invention for the Unix file system (UFS) will allow only regular files as attributes (e.g., no sub-directories) and reject attempts to place attributes on attributes.

Figure 7:
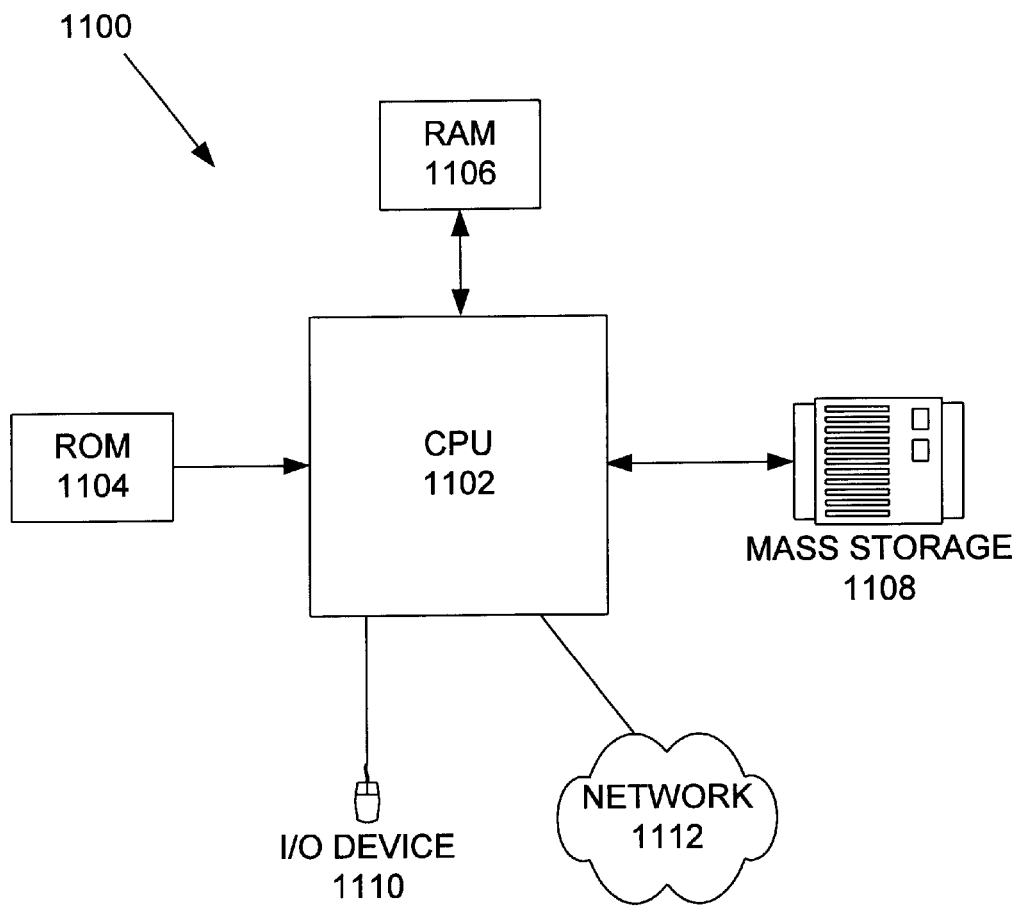
FIG. 7 illustrates a computer system employed to implement the invention.

FIG. 7 illustrates a computer system 1100 employed to implement the invention. The computer system 1100 or, more specifically, CPUs 1102, may be arranged to support a virtual machine, as will be appreciated by those skilled in the art. As is well known in the art, ROM acts to transfer data and instructions unidirectionally to the CPUs 1102, while RAM is used typically to transfer data and instructions in a bi-directional manner. CPUs 1102 may generally include any number of processors. Both primary storage devices 1104, 1106 may include any suitable computer-readable media. A secondary storage medium 1108, which is typically a mass memory device, is also coupled bi-directionally to CPUs 1102 and provides additional data storage capacity. The mass memory device 1108 is a computer-readable medium that may be used to store programs including computer code, data, and the like. Typically, mass memory device 1108 is a storage medium such as a hard disk or a tape which generally slower than primary storage devices 1104, 1106. Mass memory storage device 1108 may take the form of a magnetic or paper tape reader or some other well-known device. It will be appreciated that the information retained within the mass memory device 1108, may, in appropriate cases, be incorporated in standard fashion as part of RAM 1106 as virtual memory. A specific primary storage device 1104 such as a CD-ROM may also pass data unidirectionally to the CPUs 1102.

CPUs 1102 are also coupled to one or more input/output devices 1110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1102 optionally may be coupled to a computer or telecommunications network, e.g., an Internet network or an intranet network, using a network connection as shown generally at 1112. With such a network connection, it is contemplated that the CPUs 1102 might receive information from the network, or might output information to the network in the course of performing the above-described method steps. Such information, which is often represented as a sequence of instructions to be executed using CPUs 1102, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the multi-platform compiler can be used in any computing system.

While the present invention has been described as being used with a UNIX based operating system on a computer system, it should be appreciated that the present invention may generally be implemented on any suitable computing system having a compiler. Therefore, the present examples are to be considered as illustrative and not restrictive, and the invention is not to be limited to the details given herein, but may be modified within the scope of the appended claims along with their frill scope of equivalents.

While this invention has been described in terms of a preferred embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

What is claimed is:

1. A method for exposing a value of a selected extended attribute in an extended attribute namespace, wherein the extended attribute is associated with a node in a directory tree namespace that is orthogonal to the extended attribute namespace, comprising:
   determining if the selected extended attribute exists;
   determining if a mapping for the selected extended attribute exists;
   if the mapping for the selected extended attribute does not exist, then in the extended attribute namespace,
      creating a virtual directory,
      creating a virtual file,
      associating the virtual file with the virtual directory, and
      mapping content of the virtual file to the selected extended attribute;
   performing a selected extended attribute operation; and
   exposing a value of the selected extended attribute.

2. A method as recited in claim 1, further comprising:
   if it is determined that the selected extended attribute does not exist, then in the extended attribute namespace.
      determining if an extended attribute directory exists;
      creating the extended attribute directory;
      selecting an attribute file;
      determining if the selected attribute file exists; and
      creating the selected attribute file.

3. An apparatus for exposing a value of a selected extended attribute in an extended attribute namespace, wherein the extended attribute is associated with a node in a directory tree namespace that is orthogonal to the extended attribute namespace, comprising:
   means for determining if the selected extended attribute exists;
   means for determining if a mapping for the selected extended attribute exists;
   if the mapping of the selected extended attribute does not exist, then in the extended attribute namespace,
      means for creating a virtual directory,
      means for creating a virtual file,
      means for associating the virtual file with the virtual directory, and
      means for mapping content of the virtual file to the selected extended attribute;
   means for performing a selected extended attribute operation and
   means for exposing the selected extended attribute.

4. An apparatus as recited in claim 3, further comprising:
   if it is determined that the selected extended attribute does not exist, then in the extended attribute namespace,
      means for determining if an extended attribute directory exists;
      means for creating the extended attribute directory;
      means for selecting an attribute file;
      means for determining if the selected attribute file exists; and
      means for creating the selected attribute file.

5. Computer program product resident on a computer for exposing a value of a selected extended attribute in an extended attribute namespace, wherein the extended attribute is associated with a node in a directory tree namespace that is orthogonal to the extended attribute namespace, comprising:

computer code for determining if the selected extended attribute exists;

computer code for determining if a mapping for the selected extended attribute exists;

if the mapping of the selected extended attribute does not exist, then in the extended attribute namespace,
    computer code for creating a virtual directory,
    computer code for creating a virtual file;
    computer code for associating the virtual file with the virtual directory, and
    computer code for mapping content of the virtual file to the selected extended attribute;

computer code for performing a selected extended attribute operation;

computer code for viewing the selected extended attribute; and computer readable medium for storing the computer code.

6. Computer program product as recited in claim 5, further comprising:

if it is determined that the selected extended attribute does not exist, then in the extended attribute namespace,
    computer code for determining if an extended attribute directory exists;
    computer code for creating the extended attribute directory;
    computer code for selecting an attribute file;
    computer code for determining if the selected attribute file exists;
    computer code for creating the selected attribute file; and computer readable medium for storing the computer code.

7. Computer code as recited in claim 6, wherein the computer readable medium is selected from a group comprising: CD-ROM, DVD ROM, floppy disc, and magnetic tape.

* * * * *

UNITED STATES PATENT AND TRADEMARK OFFICE
CERTIFICATE OF CORRECTION

PATENT NO. : 6,789,094 B2
DATED : September 7, 2004
INVENTOR(S) : Rudoff et al.

It is certified that error appears in the above-identified patent and that said Letters Patent is hereby corrected as shown below:

Column 1,
Line 59, change "method a exposing" to -- method for exposing --.

Column 2,
Line 4, change "for a exposing" to -- for exposing --.

Column 5,
Line 62, change "their frill scope" to -- their full scope --.

Signed and Sealed this

Seventh Day of December, 2004

JON W. DUDAS
*Director of the United States Patent and Trademark Office*